(12) United States Patent
Oi

(10) Patent No.: US 11,328,421 B2
(45) Date of Patent: May 10, 2022

(54) IMAGE PROCESSING APPARATUS, IMAGE PROCESSING METHOD, AND STORAGE MEDIUM

(71) Applicant: NEC Corporation, Tokyo (JP)

(72) Inventor: Yusuke Oi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 57 days.

(21) Appl. No.: 16/760,102

(22) PCT Filed: Oct. 18, 2018

(86) PCT No.: PCT/JP2018/038865
§ 371 (c)(1),
(2) Date: Apr. 29, 2020

(87) PCT Pub. No.: WO2019/087803
PCT Pub. Date: May 9, 2019

(65) Prior Publication Data
US 2020/0258230 A1  Aug. 13, 2020

(30) Foreign Application Priority Data
Oct. 31, 2017  (JP) .............................. JP2017-210360

(51) Int. Cl.
*G06K 9/00* (2022.01)
*G06T 7/00* (2017.01)
*G06N 3/08* (2006.01)

(52) U.S. Cl.
CPC ............ *G06T 7/0014* (2013.01); *G06N 3/08* (2013.01); *G06T 2207/20081* (2013.01)

(58) Field of Classification Search
CPC .. F04B 39/0055; F25B 2500/12; F25B 31/02; F25B 41/30; G06N 20/00; G06N 3/08;
(Continued)

(56) References Cited

U.S. PATENT DOCUMENTS

| 2002/0031248 | A1 | 3/2002 | Maed et al. |
| 2008/0232667 | A1 | 9/2008 | Kitamura et al. |

(Continued)

FOREIGN PATENT DOCUMENTS

| JP | H11-132959 A | 5/1999 |
| JP | 2005-020337 A | 1/2005 |

(Continued)

OTHER PUBLICATIONS

International Search Report for PCT Application No. PCT/JP2018/038865, dated Jan. 22, 2019.
(Continued)

*Primary Examiner* — Xin Jia

(57) ABSTRACT

Provided are an image processing apparatus, an image processing method, and a storage medium that can distinguish an anomaly while reducing influence of an individual difference of images. The image processing apparatus includes: a generation unit that uses a part of an inspection image including an inspection target to generate an estimation image including at least a predetermined region of the inspection target; a comparison unit that compares the estimation image generated by the generation unit with the inspection image; and an output unit that outputs a comparison result obtained by the comparison unit.

10 Claims, 13 Drawing Sheets

(58) Field of Classification Search
CPC . G06T 2207/10024; G06T 2207/20021; G06T 2207/20032; G06T 2207/20081; G06T 7/0014
See application file for complete search history.

(56) References Cited

U.S. PATENT DOCUMENTS

| | | | |
|---|---|---|---|
| 2015/0269719 A1* | 9/2015 | Kitai | G06T 7/0002 358/474 |
| 2017/0069075 A1* | 3/2017 | Okuda | G06T 11/60 |
| 2019/0206047 A1* | 7/2019 | Honda | G01N 21/9501 |

FOREIGN PATENT DOCUMENTS

| | | |
|---|---|---|
| JP | 2006-178790 A | 7/2006 |
| JP | 4895204 B2 | 3/2012 |
| JP | 5546317 B2 | 7/2014 |
| JP | 2014-221163 A | 11/2014 |
| WO | 2016/132468 A1 | 8/2016 |

OTHER PUBLICATIONS

Japanese Office Action for JP Application No. 2019-551080 dated Jun. 17, 2021 with English Translation.

\* cited by examiner

IMAGE PROCESSING APPARATUS, IMAGE PROCESSING METHOD, AND STORAGE MEDIUM

This application is a National Stage Entry of PCT/JP2018/038865 filed on Oct. 18, 2018 which claims priority from Japanese Patent Application No. 2017-210360 filed Oct. 31, 2017, the contents of all of which are incorporated herein by reference, in their entirety.

TECHNICAL FIELD

The invention relates to an image processing apparatus, an image processing method, and a storage medium.

BACKGROUND ART

Patent Literature 1 discloses an image component separation apparatus that separates an abnormal component in an input medical image. The image component separation apparatus disclosed in Patent Literature 1 generates, from an input medical image representing a predetermined structure in a subject, a normal image representing normal structure of the structure in the subject. Then, a difference between the input medical image and the normal image is calculated to separate an abnormal component in the input medical image.

CITATION LIST

Patent Literature

PTL 1: Japanese Patent No. 4895204

SUMMARY OF INVENTION

Technical Problem

However, the image component separation apparatus disclosed in Patent Literature 1 generates a normal image from the whole input medical image representing a predetermined structure in the subject. Thus, in the image component separation apparatus disclosed in Patent Literature 1, since the generated normal image may be affected by the whole input medical image, separation of an abnormal component may be significantly affected by an individual difference of the input medical images.

In view of the problem described above, the present invention intends to provide an image processing apparatus, an image processing method, and a storage medium that can distinguish an anomaly while reducing influence of an individual difference of images.

Solution to Problem

According to one example aspect of the present invention, provided is an image processing apparatus including: a generation unit that uses a part of an inspection image including an inspection target to generate an estimation image including at least a predetermined region of the inspection target; a comparison unit that compares the estimation image generated by the generation unit with the inspection image; and an output unit that outputs a comparison result obtained by the comparison unit.

According to another example aspect of the present invention, provided is an image processing method including: a generation step of using a part of an inspection image including an inspection target to generate an estimation image including at least a predetermined region of the inspection target; a comparison step of comparing the estimation image generated by the generation step with the inspection image; and an output step of outputting a comparison result obtained by the comparison step.

According to yet another example aspect of the present invention, provided is a storage medium storing a program that causes a computer to perform: a generation step of using a part of an inspection image including an inspection target to generate an estimation image including at least a predetermined region of the inspection target; a comparison step of comparing the estimation image generated by the generation step with the inspection image; and an output step of outputting a comparison result obtained by the comparison step.

According to yet another example aspect of the present invention, provided is an image processing apparatus including: a generation unit that uses a part of a first image including an object to generate a second image including at least a predetermined region of the object; a comparison unit that compares the second image generated by the generation unit with the first image; and an output unit that outputs a comparison result obtained by the comparison unit.

Advantageous Effects of Invention

According to the present invention, it is possible to distinguish an anomaly at high accuracy while reducing influence of an individual difference of images.

DESCRIPTION OF EMBODIMENTS

First Example Embodiment

An image processing apparatus and an image processing method according to a first example embodiment of the present invention will be described with reference to FIG. 1 to FIG. 15.

Figure 1:
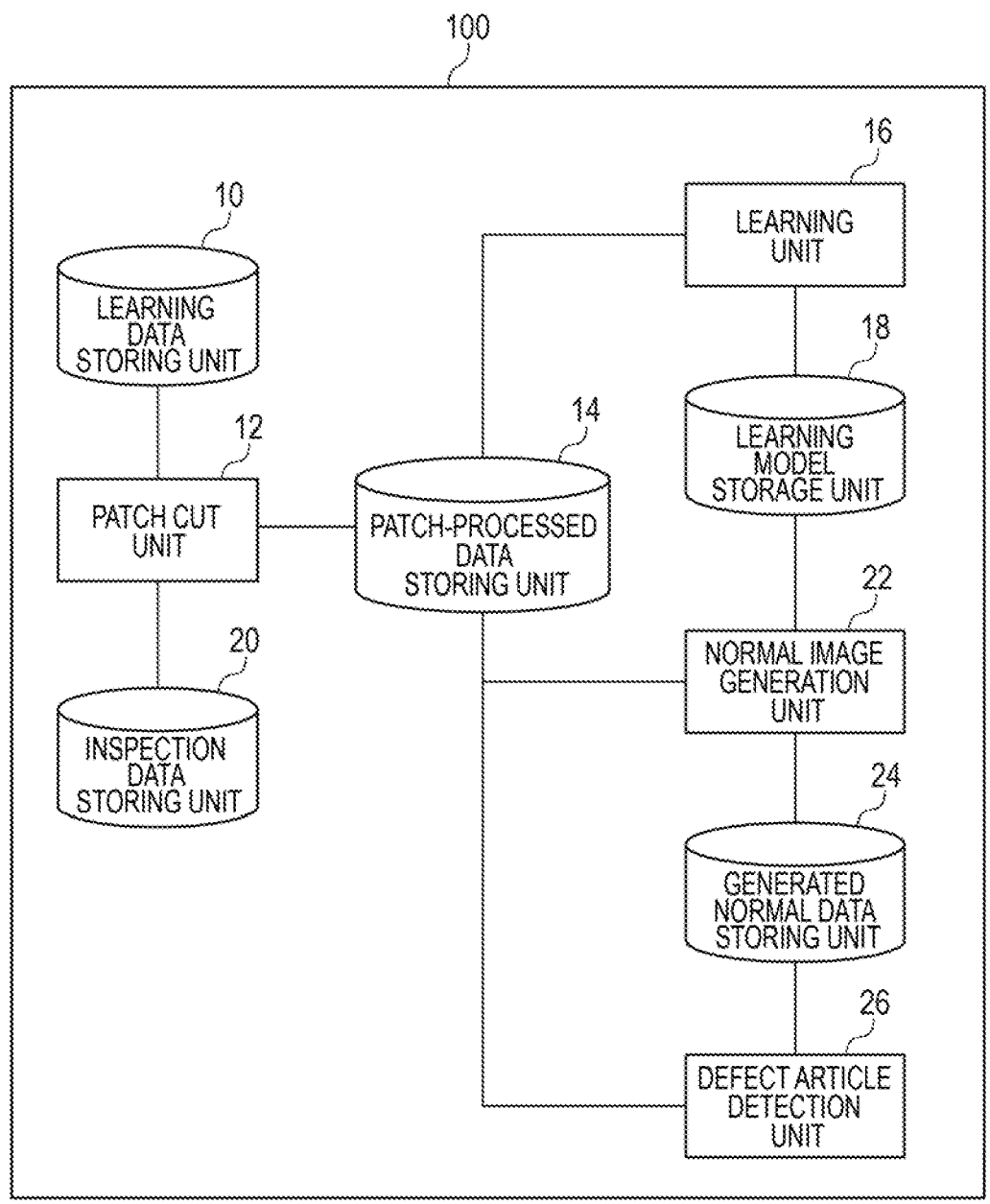
FIG. 1 is a block diagram illustrating a function configuration of an image processing apparatus according to a first example embodiment of the present invention.
Figure 2:
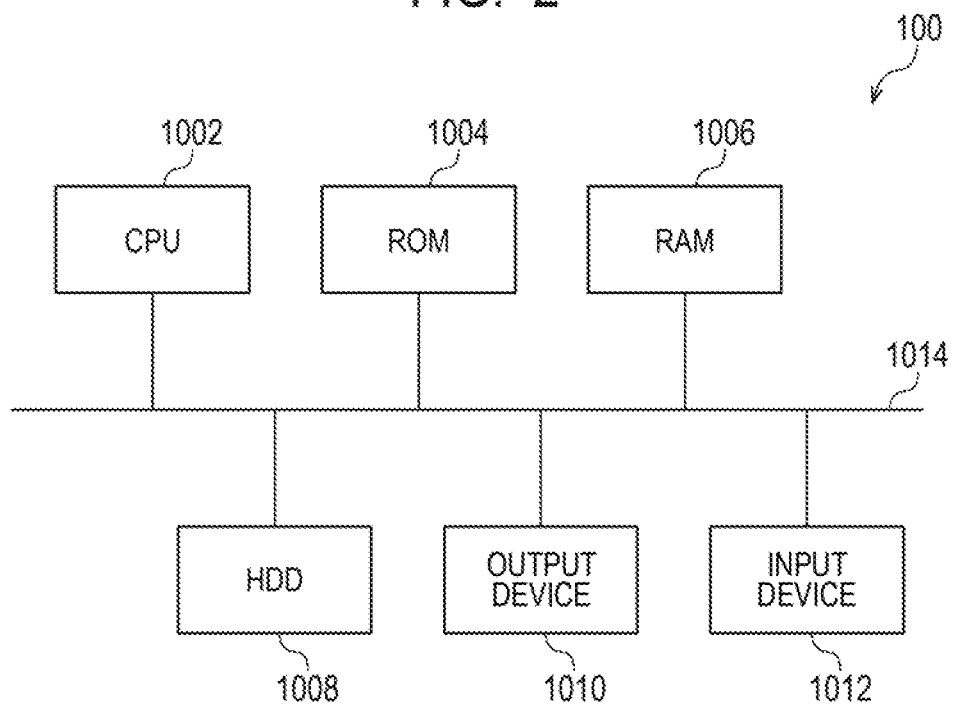
FIG. 2 is a block diagram illustrating a hardware configuration example of the image processing apparatus according to the first example embodiment of the present invention.

First, the configuration of the image processing apparatus according to the present example embodiment will be described with reference to FIG. 1 and FIG. 2. FIG. 1 is a block diagram illustrating a function configuration of the image processing apparatus according to the present example embodiment. FIG. 2 is a block diagram illustrating a hardware configuration example of the image processing apparatus according to the present example embodiment.

In the present example embodiment, a case where the image processing apparatus processes an inspection image including an inspection target article that is an inspection target, thereby determines whether the inspection target article is a normal article or a defect article, and performs inspection to detect a defect article as an anomaly will be described as an example. Note that the image processing apparatus according to the present example embodiment can be widely used not only for performing inspection to detect a defect article but also for detecting an anomaly for an object.

As illustrated in FIG. 1, an image processing apparatus 100 according to the present example embodiment has a learning data storing unit 10, a patch cut unit 12, and a patch-processed data storing unit 14. Further, the image processing apparatus 100 has a learning unit 16 and a learning model storage unit 18. Moreover, the image processing apparatus 100 has an inspection data storing unit 20, a normal image generation unit 22, a generated normal data storing unit 24, and a defect article detection unit 26.

The learning data storing unit 10 stores a learning image used for learning performed by the learning unit 16. The learning image is an image including a normal article of an inspection target article, that is, an image representing a normal state of the inspection target article.

The patch cut unit 12 reads learning image data from the learning data storing unit 10 and performs a patch cut step on the learning image. That is, the patch cut unit 12 cuts out a patch size image as a patch image from a learning image. Further, the patch cut unit 12 cuts out an image of the center part as a center image from the patch image. The center image includes at least a predetermined region of an inspection target article. The patch cut unit 12 outputs a pair of a center-removed patch image, which is a patch image from which the center image has been cut out, and the center image thereof in association with each other as an image pair. The patch cut unit 12 stores the image pair output for the learning image in the patch-processed data storing unit 14.

Further, the patch cut unit 12 reads inspection image data from the inspection data storing unit 20 and performs a patch cut process on an inspection image as with the case of the learning image. The patch cut unit 12 outputs a pair of a center-removed patch image and the center image thereof in association with each other as an image pair for the inspection image as with the case of the learning image. The patch cut unit 12 stores the image pair output for the inspection image in the patch-processed data storing unit 14.

The patch-processed data storing unit 14 stores an image pair for a learning image output by the patch cut unit 12. Further, the patch-processed data storing unit 14 stores an image pair for an inspection image output by the patch cut unit 12.

The learning unit 16 reads an image pair for a learning image from the patch-processed data storing unit 14 and creates a learning model by using the read image pair. The learning unit 16 performs learning by using a center-removed patch image as learning data and a center image as training data out of an image pair for a learning image and creates a learning model used for restoring a center image from the center-removed patch image. The learning unit 16 stores the created learning model in the learning model storage unit 18.

The learning model storage unit 18 stores the trained learning model created as a result of learning performed by the learning unit 16.

The inspection data storing unit 20 stores an inspection image. The inspection image is an image including an inspection target article that is an inspection target. The inspection target article is not particularly limited. The image processing apparatus according to the present example embodiment can define any object such as a completed article or a component, for example, as an inspection target article.

The normal image generation unit 22 functions as a generation unit and estimates, from a center-removed patch image out of an image pair for an inspection image, a center image that is an image of the center part thereof and generates, as a normal image, an estimation image estimated by the center-removed patch image. The normal image includes at least a predetermined region of an inspection target article included in an inspection image. The normal image generation unit 22 reads a center-removed patch image out of an image pair for an inspection image from the patch-processed data storing unit 14. The normal image generation unit 22 estimates a center image of a center-removed patch image from the read center-removed patch image and generates it as a normal image. When generating the normal image that is an estimation image, the normal image generation unit 22 reads the trained learning model from the learning model storage unit 18. The normal image generation unit 22 estimates a center image from a center-removed patch image that is a part of a patch image in an inspection image by using the read learning model and generates the estimated estimation image as a normal image. The normal image generation unit 22 stores the generated normal image in the generated normal data storing unit 24. In such a way, the normal image generation unit 22 estimates and generates a normal image by using a center-removed patch image that is a part of a patch image.

The generated normal data storing unit 24 stores the normal image generated by the normal image generation unit 22.

The defect article detection unit 26 functions as a comparison unit and compares a center image out of an image pair for an inspection image with a normal image generated from a center-removed patch image thereof. Moreover, the defect article detection unit 26 functions as an output unit and outputs a result of the comparison. Further, the defect article detection unit 26 functions as a determination unit and determines whether an inspection target article included in an inspection image is a normal article or a defect article based on the comparison result.

The defect article detection unit 26 reads a center image out of an image pair for the inspection image from the patch-processed data storing unit 14. Further, the defect article detection unit 26 reads a normal image generated from a center-removed patch image out of the image pair. The defect article detection unit 26 compares each read center image with a normal image and determines whether or not the center image and the normal image are the same. Accordingly, the defect article detection unit 26 determines whether an inspection target article included in an inspection image is a normal article or a defect article and distinguishes and detects a defect article that is abnormal.

The defect article detection unit 26 outputs a detection result of a defect article. An output method of the detection result is not particularly limited, and various methods may be used. For example, the defect article detection unit 26 can cause a display device to display a detection result, output the detection result as a voice from an audio output device, and store the detection result in a database stored in a storage device.

The image processing apparatus 100 described above is formed of a computer apparatus, for example. An example of a hardware configuration of the image processing apparatus 100 will be described with reference to FIG. 2. Note that the image processing apparatus 100 may be formed of a single apparatus or may be formed of two or more physically separated apparatuses connected by wired or wireless connection.

As illustrated in FIG. 2, the image processing apparatus 100 has a central processing unit (CPU) 1002, a read only memory (ROM) 1004, a random access memory (RAM) 1006, and a hard disk drive (HDD) 1008. Further, the image processing apparatus 100 has an output device 1010 and an input device 1012. The CPU 1002, the ROM 1004, the RAM 1006, the HDD 1008, the output device 1010, and the input device 1012 are connected to a common bus line 1014.

The CPU 1002 controls the overall operation of the image processing apparatus 100. Further, the CPU 1002 executes a program to realize functions of each unit of the above patch cut unit 12, the learning unit 16, the normal image generation unit 22, and the defect article detection unit 26. The CPU 1002 implements functions of each unit of the patch cut unit 12, the learning unit 16, the normal image generation unit 22, and the defect article detection unit 26 by loading a program stored in the HDD 1008 or the like to the RAM 1006 and executing the program.

Note that the patch cut unit 12, the learning unit 16, the normal image generation unit 22, and the defect article detection unit 26 may be implemented by a circuitry, respectively. Herein, the circuitry is a term conceptually including a single device, multiple devices, a chipset, or a cloud.

A program such as a boot program is stored in the ROM 1004. The RAM 1006 is used as a working area when the CPU 1002 executes a program. Further, a program executed by the CPU 1002 is stored in the HDD 1008.

Further, the HDD 1008 is a storage device that implements functions of each unit of the above learning data storing unit 10, the patch-processed data storing unit 14, the learning model storage unit 18, and the generated normal data storing unit 24. Note that a storage device that implements functions of each unit of the learning data storing unit 10, the patch-processed data storing unit 14, the learning model storage unit 18, and the generated normal data storing unit 24 is not limited to the HDD 1008. Various storage devices can be used for implementing functions of respective units.

The output device 1010 is a device that outputs a result of inspection performed by the defect article detection unit 26 and may be, for example, a display device or an audio output device.

The input device 1012 is a keyboard, a mouse, or the like, for example. Further, the input device 1012 may be a touch panel embedded in a display device that is the output device 1010. An operator of the image processing apparatus 100 can set the image processing apparatus 100 via the input device 1012 or can input an instruction of performing a process.

Note that a hardware configuration of the image processing apparatus 100 is not limited to the configuration described above, and various configuration can be used.

Next, an operation of the image processing apparatus 100 according to the above present example embodiment will be further described with reference to FIG. 3 to FIG. 14. The image processing apparatus 100 according to the present example embodiment operates to perform a method of the image processing apparatus.

Figure 12:
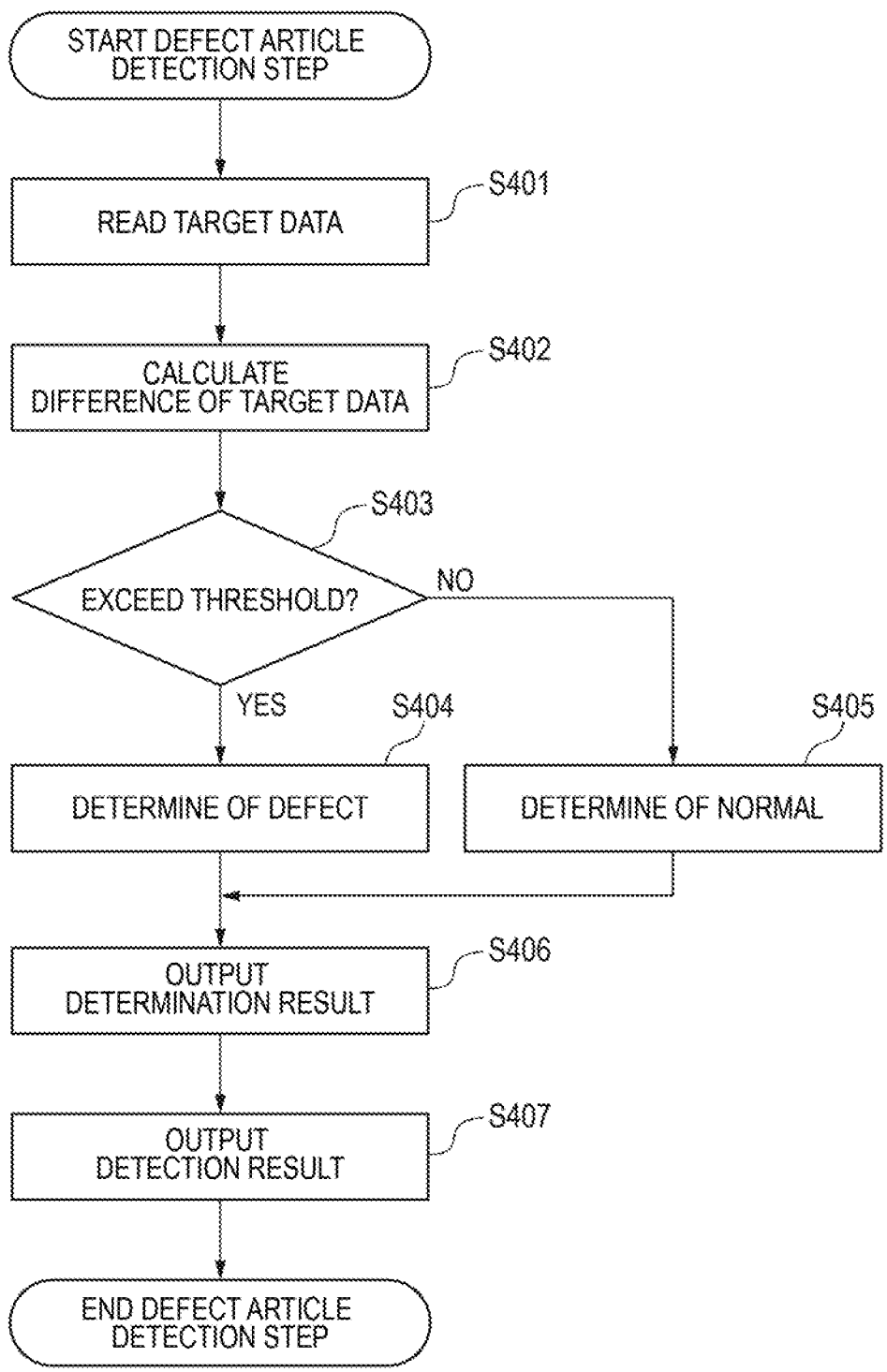
FIG. 12 is a flowchart illustrating a defect article detection step in the operation of the image processing apparatus according to the first example embodiment of the present invention.

The operation of the image processing apparatus 100 according to the present example embodiment includes a patch cut step (see FIG. 3), a learning step (see FIG. 7), a normal image generation step (see FIG. 10), and a defect article detection step (see FIG. 12). The patch cut step is performed by the patch cut unit 12. The learning step is performed by the learning unit 16. The normal image generation step is performed by the normal image generation unit 22. The defect article detection step is performed by the defect article detection unit 26.

Figure 3:
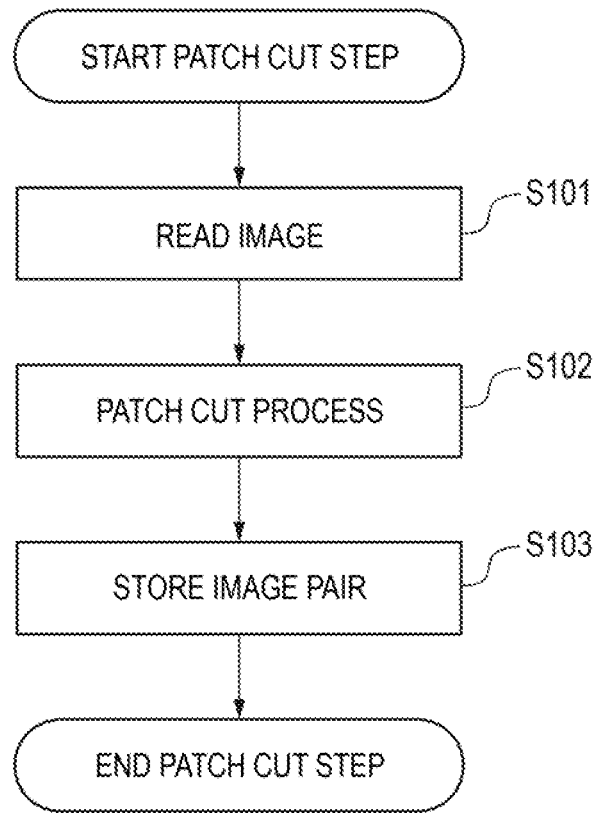
FIG. 3 is a flowchart illustrating a patch cut step in the operation of the image processing apparatus according to the first example embodiment of the present invention.
Figure 4:
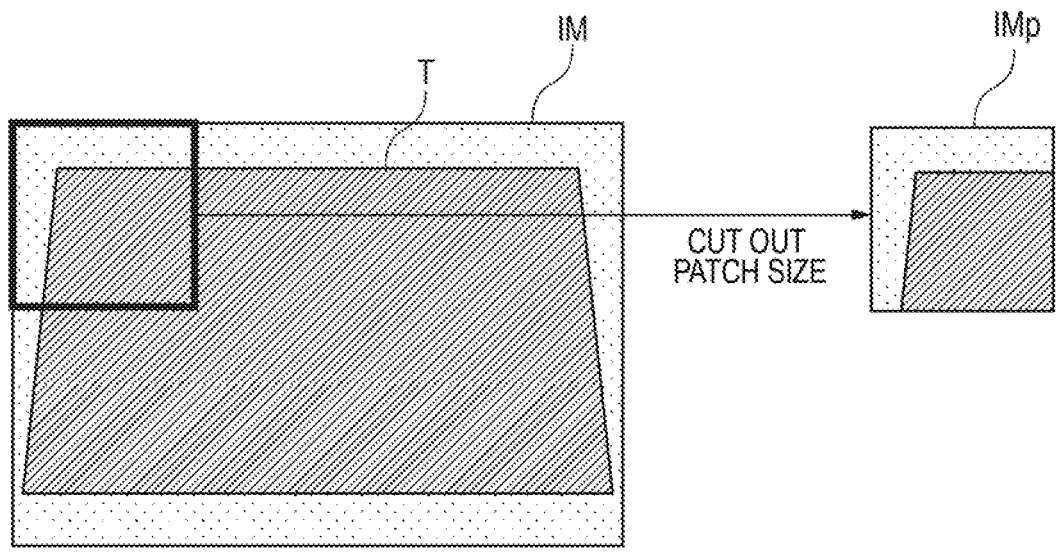
FIG. 4 is a schematic diagram (1) illustrating the patch cut step in the operation of the image processing apparatus according to the first example embodiment of the present invention.
Figure 5:
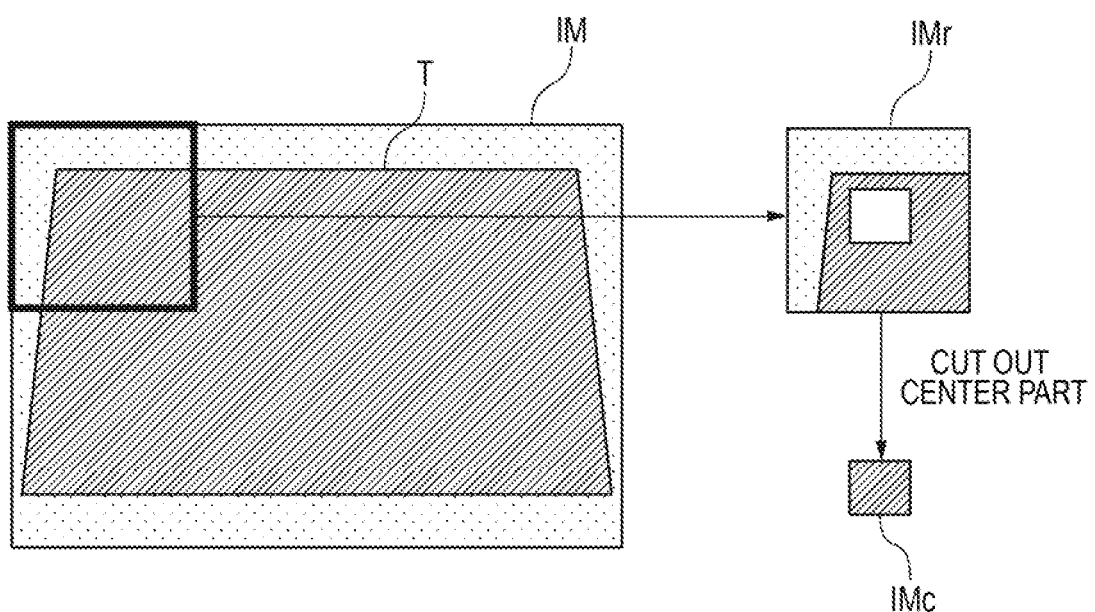
FIG. 5 is a schematic diagram (2) illustrating the patch cut step in the operation of the image processing apparatus according to the first example embodiment of the present invention.
Figure 6:
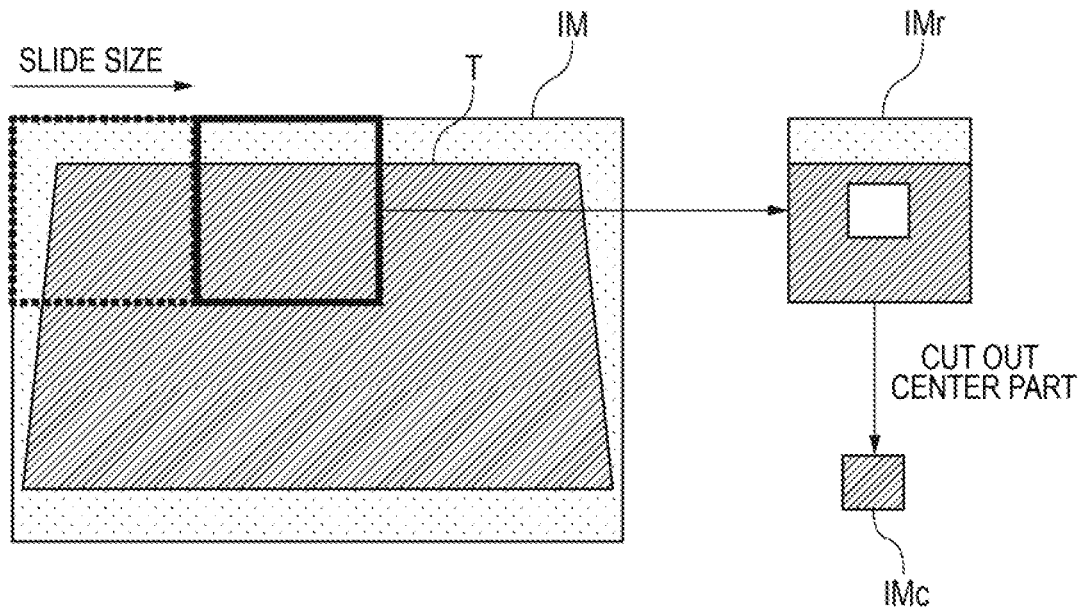
FIG. 6 is a schematic diagram (3) illustrating the patch cut step in the operation of the image processing apparatus according to the first example embodiment of the present invention.

First, the patch cut step in the operation of the image processing apparatus 100 according to the present example embodiment will be described with reference to FIG. 3 to FIG. 6. FIG. 3 is a flowchart illustrating the patch cut step in the operation of the image processing apparatus 100 according to the present example embodiment. FIG. 4 to FIG. 6 are schematic diagrams illustrating the patch cut step in the operation of the image processing apparatus 100 according to the present example embodiment.

The patch cut step performed by the patch cut unit 12 performs cutting of a patch image from an image, removal of an image of a center part of the patch image, or the like. The patch cut step is performed for each of a learning image and an inspection image.

First, as illustrated in FIG. 3, in step S101, the patch cut unit 12 reads data of an image on which the patch cut step is to be performed. When the patch cut step is performed on the learning image, the patch cut unit 12 reads the learning image from the learning data storing unit 10. On the other hand, when the patch cut step is performed on the inspection image, the patch cut unit 12 reads image data from the inspection data storing unit 20.

Next, in step S102, the patch cut unit 12 performs a patch cut process on the image read in step S101. As illustrated in FIG. 4, an image IM read in step S101 includes an inspection target article T. The image IM is a learning image or an inspection image. When the image IM is a learning image, the inspection target article T included in the image IM is a normal article. When the image IM is an inspection image, the inspection target article T included in the image IM is an article that is to be determined whether it is a normal article or a defect article.

In the patch cut process, as illustrated in FIG. 4, the patch cut unit 12 cuts out a rectangular image having a preset patch size from the read image IM as a patch image IMp, for example, from the left upper of the image IM. Note that the patch size used for cutting the patch image IMp can be appropriately set in accordance with accuracy or the like required for the inspection within a range of the size that is smaller than the image IM.

Moreover, in the patch cut process, as illustrated in FIG. 5, the patch cut unit 12 cuts out and removes a rectangular image having a preset size from the center part of the cut patch image IMp. In such a way, the patch cut unit 12 creates a center-removed patch image IMr, which is a frame-shape patch image IMp for which an image of the center part has been removed, and creates a center image IMc, which is an image cut out of the center part of the patch image IMp. The patch image IMp obtained before the patch cut process is performed includes the center-removed patch image IMr that is a first region and the center image IMc that is a second region and can be considered to be formed of both images. Note that the size at which the center image IMc is cut out can be appropriately set in accordance with accuracy or the like required for the inspection within a range of the size that is smaller than the patch image IMp.

As illustrated in FIG. 6, the patch cut unit 12 then cuts out the patch image IMp from the position that has moved in the slide direction in the image IM by a preset slide size in the same manner as described above and creates the center-removed patch image IMr and the center image IMc. Note that the slide size can be set to be equal to or smaller than the width in the slide direction of the patch size for cutting out the patch image IMp.

The patch cut unit 12 repeatedly performs the operation illustrated in FIG. 4 to FIG. 6 described above for the whole region of the image IM before the patch image IMp is cut out and creates an image pair that is a pair of the center-removed patch image IMr and the center image IMc for the image IM.

Note that, while both the patch image IMp and the center image IMc are rectangular in the above description, the shapes thereof are not limited to a quadrilateral such as a rectangular. The shape of the patch image IMp and the center image IMc may be any shape that can be used for creating a pair of the center-removed patch image IMr, which is a peripheral image, and the center image IMc, such as a circle or a triangle, for example, in addition to a quadrilateral. The shape of the patch image IMp and the center image IMc is not required to be the same image or may be different from each other.

Further, while an image is cut out of a center part of the patch image IMp in the above description, when a preset size image is cut out of the patch image IMp, a region from which an image is cut out of the patch image IMp is not limited to the center part. That is, the patch cut unit 12 may cut out a part of the patch image IMp and create a partial image that is a part of the patch image IMp instead of the center image IMc. When a partial image that is a part of the patch image IMp is created instead of the center image IMc, the same process is applied except for using the partial image instead of the center image IMc.

Next, in step S103, the patch cut unit 12 stores an image pair that is a pair of the center-removed patch image IMr and the center image IMc created for the image IM in step S102 in the patch-processed data storing unit 14.

As described above, the patch cut unit 12 performs the patch cut step for a learning image and an inspection image, respectively. Note that the patch cut step for the learning image is performed before the learning step. On the other hand, the patch cut step for an inspection image can be performed before the learning step or performed after the learning step as long as the patch cut step is performed before the normal image generation step.

Figure 7:
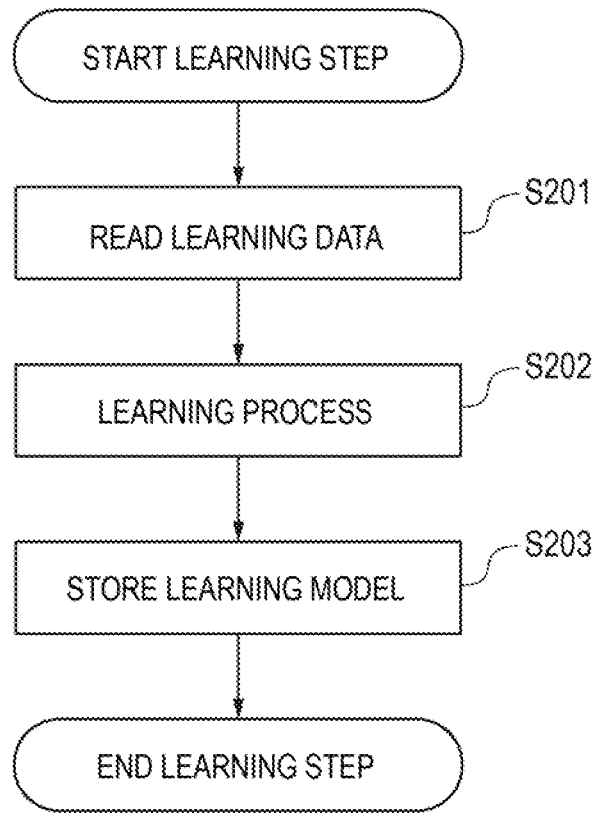
FIG. 7 is a flowchart illustrating a learning step in the operation of the image processing apparatus according to the first example embodiment of the present invention.
Figure 8:
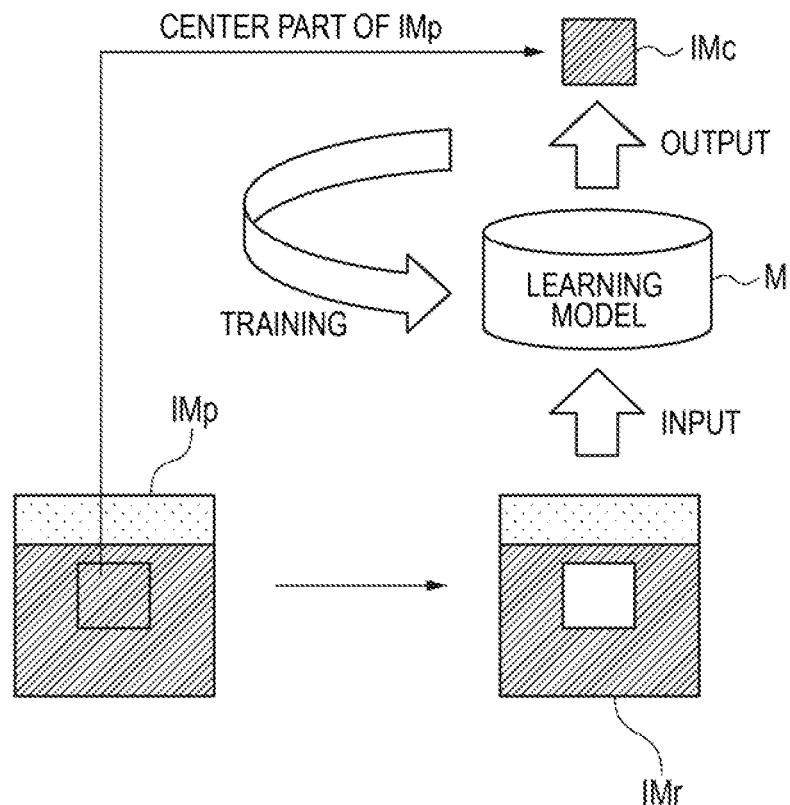
FIG. 8 is a schematic diagram (1) illustrating a learning step in the operation of the image processing apparatus according to the first example embodiment of the present invention.
Figure 9:
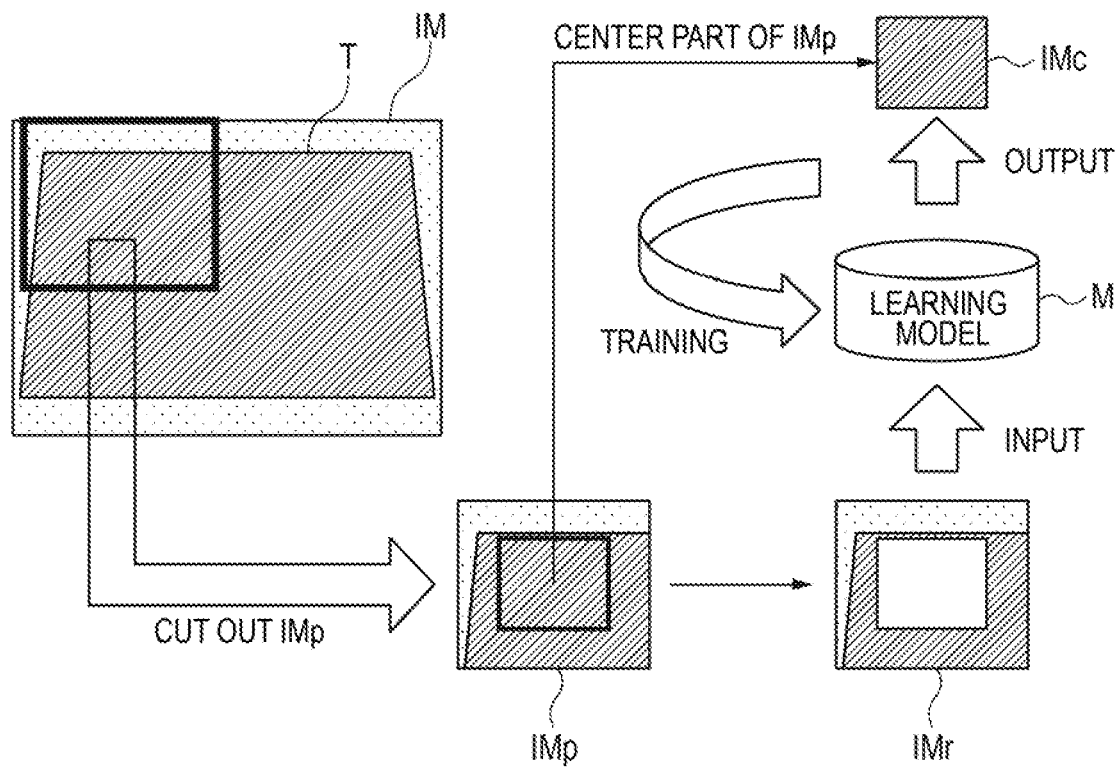
FIG. 9 is a schematic diagram (2) illustrating the learning step in the operation of the image processing apparatus according to the first example embodiment of the present invention.

Next, the learning step in the operation of the image processing apparatus 100 according to the present example embodiment will be described with reference to FIG. 7 to FIG. 9. FIG. 7 is a flowchart illustrating the learning step in the operation of the image processing apparatus 100 according to the present example embodiment. FIG. 8 and FIG. 9 are schematic diagrams illustrating the learning step in the operation of the image processing apparatus 100 according to the present example embodiment.

The learning step performed by the learning unit 16 is performed after the patch cut step for the learning image. The learning step performs supervised machine learning by using the learning image data on which the patch cut step has been performed and creates a learning model.

First, as illustrated in FIG. 7, in step S201, the learning unit 16 reads learning data used for the supervised machine learning from the patch-processed data storing unit 14. The learning data read by the learning unit 16 is data of the image pair that is a pair of a center-removed patch image and a center image created for a learning image.

Next, in step S202, the learning unit 16 performs a learning process in which learning is performed by using a center-removed patch image as learning data and a center image as training data out of image pairs of the learning data read in step S201. The learning unit 16 trains a learning model by using the center-removed patch image and the center image created for the learning image that is an image representing the normal state of an inspection target article.

FIG. 8 and FIG. 9 illustrate a view of learning performed by the learning unit 16 in step S202. As illustrated in FIG. 8, the learning unit 16 creates a learning model M that generates an estimation image used for estimating the center image IMc by restoring the center image IMc that is training data from the center-removed patch image IMr of learning data. Herein, as a scheme for creating the learning model M, the learning unit 16 can use a scheme that can reproduce input, such as an autoencoder, for example. Further, the learning unit 16 can perform machine learning using deep learning as a learning scheme, for example. As illustrated in FIG. 9, for the image IM that is a learning image, the learning unit 16 performs learning for creating the learning model M by using a plurality of image pairs of the center-removed patch image IMr and the center image IMc that are created from the cut patch image IMp. In such a way, the learning model M trained by using the center-removed patch image IMr and the center image IMc created for the learning image that is an image representing the normal state of an inspection target article is created.

Next, in step S203, the learning unit 16 stores the trained learning model created in step S202 in the learning model storage unit 18.

As described above, the learning unit 16 creates the learning model used for restoring the center image that is the other part of the patch image from the center-removed patch image that is a part of the patch image. The learning unit 16 can create a learning model by performing the learning step before the normal image generation step described later and store the created learning model in the learning model storage unit 18 in advance.

In general, in machine learning such as deep learning, a large amount of correct answer data is required to achieve high accuracy. When distinguishing a normal article and a defect article, it is necessary to collect a sufficient amount of data for both normal articles and defect articles as correct answer data. At a site in the actual implementation, however, it is difficult to sufficiently collect data on defect articles.

On the other hand, in the present example embodiment, since machine learning is performed by using a center-removed patch image and a center image that are created from the learning image that is an image including a normal article of an inspection target article, an image including a defect article of an inspection target article is not required to be prepared as a learning image. Therefore, according to the present example embodiment, since sufficient amount of learning data can be easily prepared, the learning model can be easily created.

Figure 10:
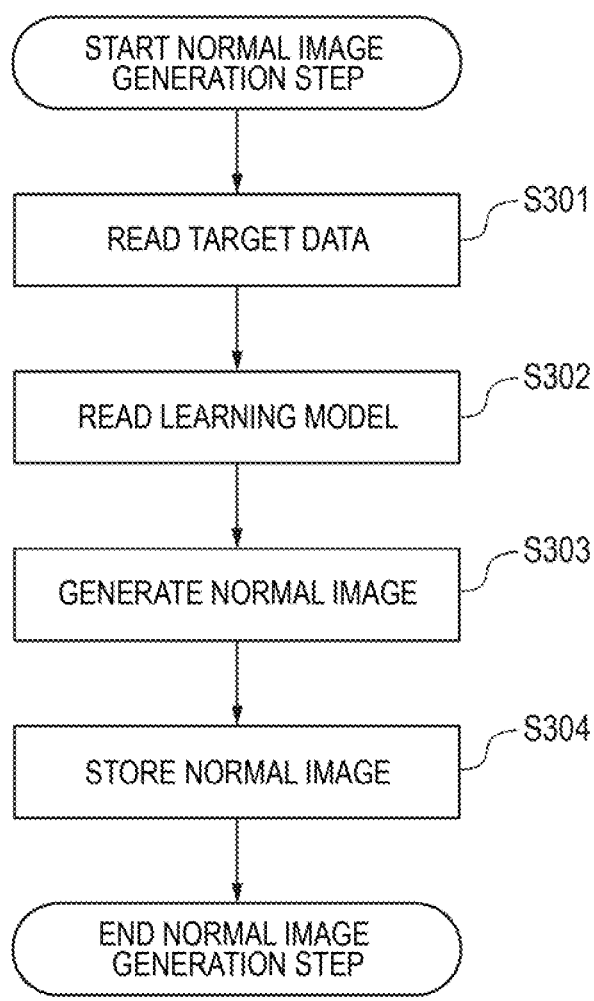
FIG. 10 is a flowchart illustrating a normal image generation step in the operation of the image processing apparatus according to the first example embodiment of the present invention.
Figure 11:
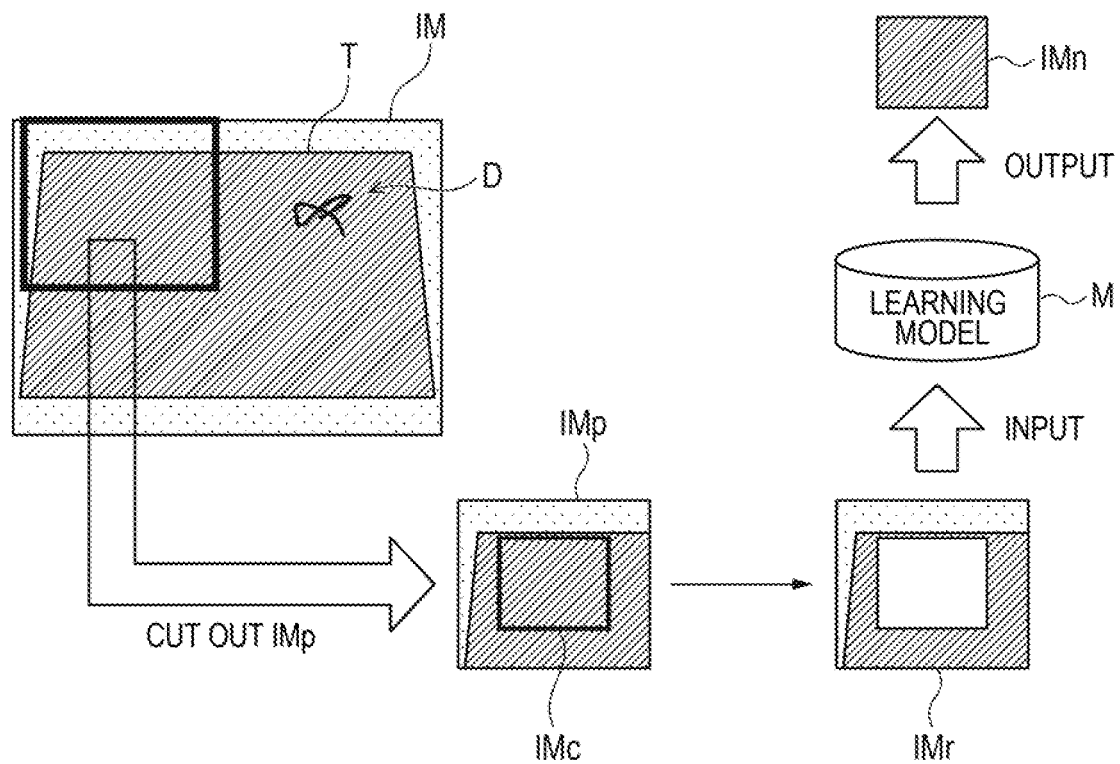
FIG. 11 is a schematic diagram illustrating the normal image generation step in the operation of the image processing apparatus according to the first example embodiment of the present invention.

Next, the normal image generation step in the operation of the image processing apparatus 100 according to the present example embodiment will be described with reference to FIG. 10 and FIG. 11. FIG. 10 is a flowchart illustrating the normal image generation step in the operation of the image processing apparatus 100 according to the present example embodiment. FIG. 11 is a schematic diagram illustrating the normal image generation step in the operation of the image processing apparatus 100 according to the present example embodiment.

The normal image generation step performed by the normal image generation unit 22 uses a learning model and a center-removed patch image of an inspection image to generate a normal image that is an estimation image used for estimating a center image of an inspection image.

First, as illustrated in FIG. 10, in step S301, the normal image generation unit 22 reads target data used for generating a normal image from the patch-processed data storing unit 14. Herein, the target data read by the normal image generation unit 22 is the center-removed patch image data created in the patch cut step from the inspection image data of the inspection data storing unit 20. The normal image generation unit 22 uses the center-removed patch image out of an image pair created for the inspection image by the patch cut unit 12 as an image to be input to a learning model.

Next, in step S302, the normal image generation unit 22 reads the trained learning model from the learning model storage unit 18. Note that step S301 and step S302 may be performed at different times or may be performed at the same time.

Next, in step S303, the normal image generation unit 22 uses the learning model read in step S302 to generate a normal image by using the center-removed patch image read in step S301. The normal image generation unit 22 uses a learning model to estimate and generate, as a normal image, a center image for the case where an inspection target article is a normal article from the center-removed patch image for the inspection image read in step S301.

FIG. 11 illustrates a view of generation of a normal image performed by the normal image generation unit 22 in step S303. As illustrated in FIG. 11, the normal image generation unit 22 uses the center-removed patch image IMr created from the cut patch image IMp as an input for the learning model M for the image IM that is an inspection image. The normal image generation unit 22 generates, as output of the learning model M for input of the center-removed patch image IMr, a normal image IMn that is an image in which the center image IMc for the case where an inspection target article is a normal article is estimated. Note that an inspection target article T included in the image IM that is an inspection image may have a defect D such as a scratch.

Next, in step S304, the normal image generation unit 22 stores the normal image created in step S303 in the generated normal data storing unit 24.

As described above, the normal image generation unit 22 uses a learning model to generate a normal image for each of the plurality of center-removed patch images created from the inspection image.

As a method for detecting a defect article, a scheme for preparing a template of a normal article to detect a defect article based on a difference between the template and an inspection image without using machine learning is considered. In such a method using a template, however, detection of a defect article may be affected by an individual difference of inspection target articles, that is, an individual difference of inspection images.

In contrast, in the present example embodiment, a normal image is estimated and generated from a center-removed patch image in an inspection image, and a defect article is detected based on the estimated normal image. Thus, in the present example embodiment, detection of a defect article with high robustness can be realized unlike the case where a template of a normal article is used.

Figure 13:
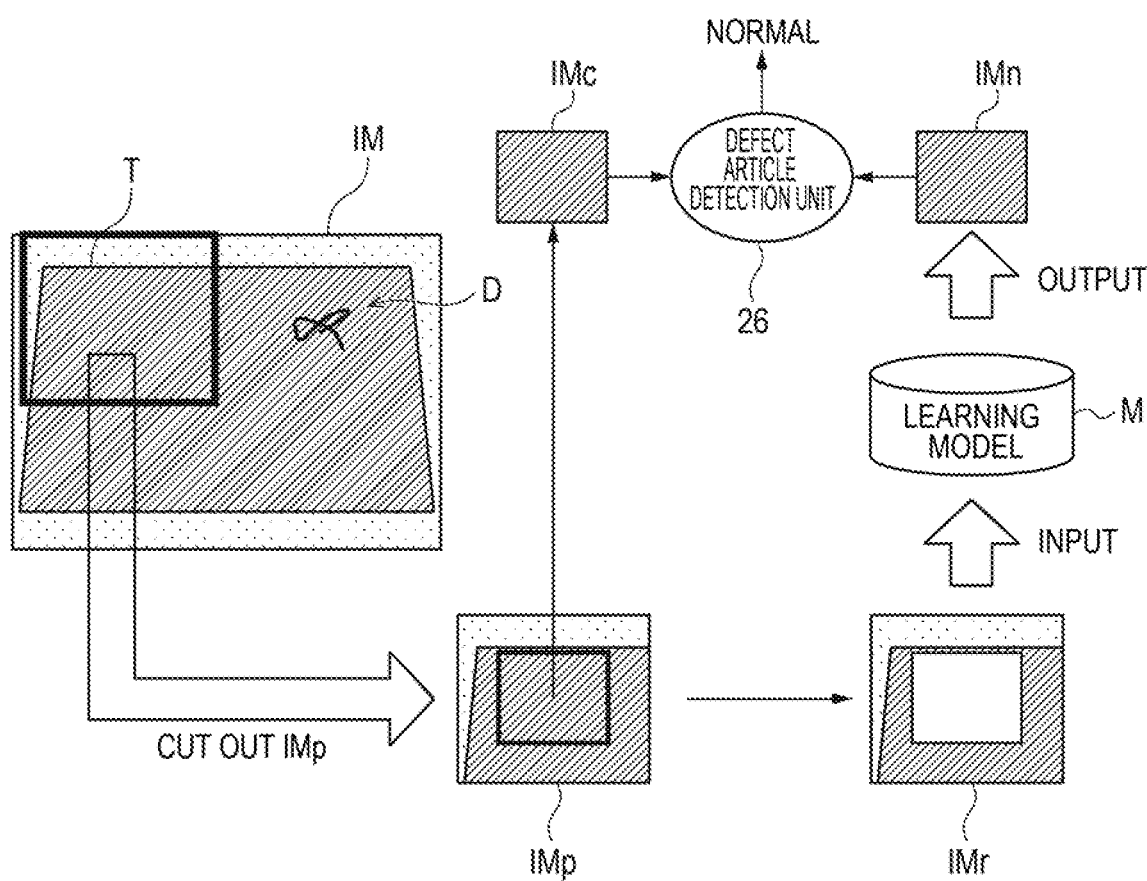
FIG. 13 is a schematic diagram (1) illustrating the defect article detection step in the operation of the image processing apparatus according to the first example embodiment of the present invention.
Figure 14:
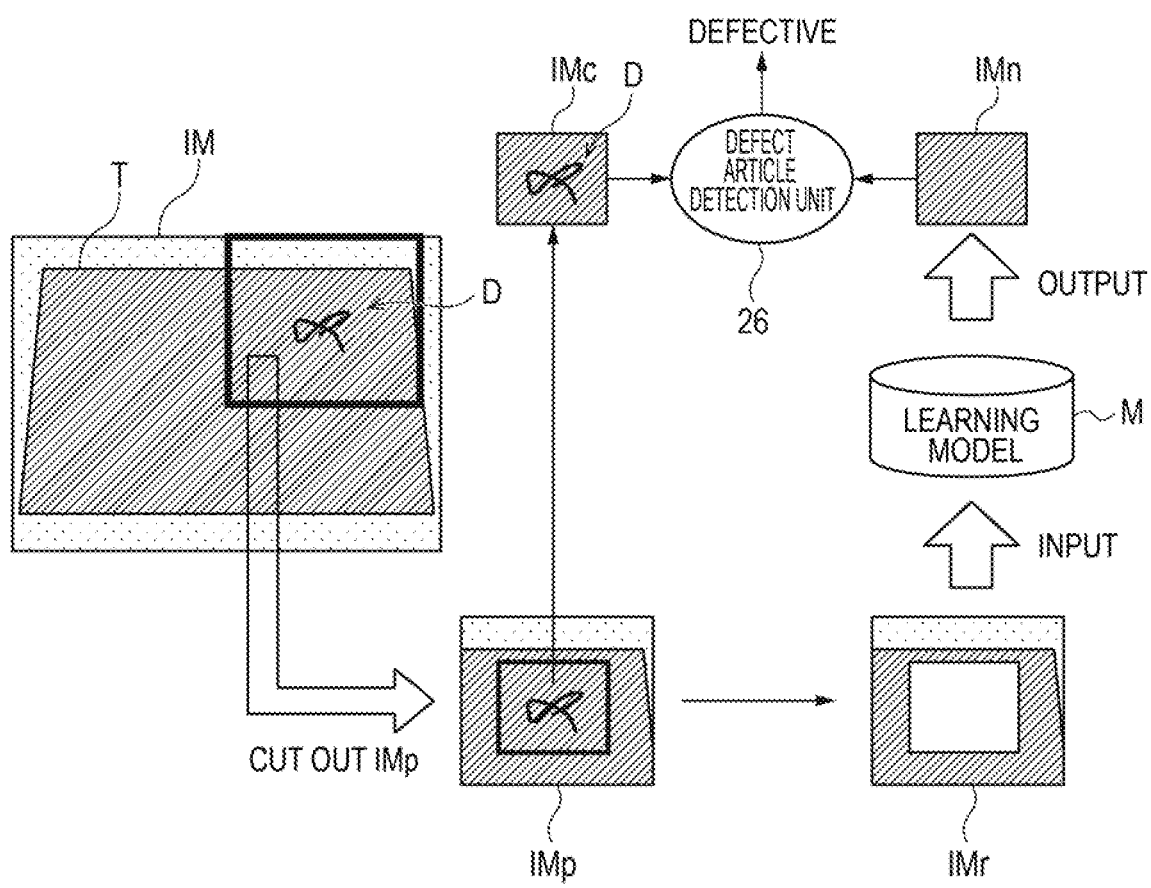
FIG. 14 is a schematic diagram (2) illustrating the defect article detection step in the operation of the image processing apparatus according to the first example embodiment of the present invention.

Next, the defect article detection step in an operation of the image processing apparatus 100 according to the present example embodiment will be described with reference to FIG. 12 to FIG. 14. FIG. 12 is a flowchart illustrating the defect article detection step in the operation of the image processing apparatus according to the present example embodiment. FIG. 13 and FIG. 14 are schematic diagrams illustrating the defect article detection step in the operation of the image processing apparatus 100 according to the present example embodiment.

The defect article detection step performed by the defect article detection unit 26 calculates a difference between a center image out of an image pair of a center-removed patch image and a center image created for an inspection image and a normal image generated from the center-removed patch image. Moreover, in the defect article detection step, a defect article, which is abnormal, is distinguished and detected based on the calculated difference.

First, as illustrated in FIG. 12, in step S401, the defect article detection unit 26 reads, as one of the target data, a center image data out of an image pair of a center-removed patch image and a center image created for an inspection image from the patch-processed data storing unit 14. Further, in step S401, the defect article detection unit 26 reads, as the other of the target data, a normal image data created by using a learning model from the center-removed patch image forming an image pair together with the read center image from the generated normal data storing unit 24. The normal image is a center image estimated from a center-removed patch image.

Next, in step S402, the defect article detection unit 26 calculates a difference between two types of center images read in step S401, that is, a difference between the center image and the normal image and determines whether or not both images are the same based on the difference. A calculation method of the difference between both images is not particularly limited, and calculation methods described below can be used. For example, as a difference, it is possible to calculate an absolute value of a difference of pixel values of pixels at a certain position or pixels included in a certain region of a center image and a normal image. Further, as a difference, it is possible to calculate the area in which regions each having a difference of pixel values between a center image and a normal image are continuous. Further, as a difference, it is possible to calculate the sum of the areas of regions each having a difference of pixel values between a center image and a normal image. Further, as a difference, it is possible to calculate the sum of differences of pixel values for respective pixel values between center images and normal images. Further, as a difference, it is possible to calculate the average of differences of pixel values for respective pixel values between center images and normal images. Further, as a difference, it is possible to calculate the sum of squared difference (SSD) or the sum of absolute difference (SAD).

Note that, when a difference between two types of center images is calculated, two types of center images of RGB images or other color images can be used not only for calculation of a difference directly but also for calculation of a difference after performing conversion into another type of images or images defined by another color space and a filtering process, for example. For example, the two types of center images can be used for calculation of a difference after converted into another type of images such as gray scale images or binary images, or images defined by another color space such as HSV or YCbCr. Further, two types of center images can be used for calculation of a difference after a filtering process using a preprocessing filter such as an averaging filter, a median filter, or the like or an edge extraction filter such as a Sobel filter or a Laplacian filter, for example is performed thereon.

Next, in step S403, the defect article detection unit 26 determines whether or not the difference calculated in step S402 exceeds a preset threshold. Herein, a setting method of the threshold that is an index used for determining a normal article and a defect article is not particularly limited, and the threshold can be set manually, for example. In addition, it is also possible to automatically set a threshold so that only an inspection image including a normal article can be used to perform verification and all the inspection images including a normal article used for verification can be correctly determined as a normal article.

If the defect article detection unit 26 determines that the difference does not exceed the threshold (step S403, NO), the defect article detection unit 26 determines that the center image created from an inspection image is the same as a normal image and that the center image is normal (step S405). On the other hand, if the defect article detection unit 26 determines that the difference exceeds the threshold (step S403, YES), the defect article detection unit 26 determines that the center image created from an inspection image is different from a normal image and that the center image is defective (step S404).

FIG. 13 illustrates a view of a case where the center image IMc created from the image IM that is an inspection image is determined as normal. As illustrated in FIG. 13, the defect article detection unit 26 compares the center image IMc and the normal image IMn to calculate the difference thereof, and as a result, since the difference thereof does not exceed the threshold, the defect article detection unit 26 determines that the center image IMc is normal. In the case illustrated in FIG. 13, since the center image IMc does not include a defect D, the difference does not exceed the threshold, and the center image IMc is determined as normal.

On the other hand, FIG. 14 illustrates a view of a case where the center image IMc created from the image IM that is an inspection image is determined as defective. As illustrated in FIG. 14, the defect article detection unit 26 comperes the center image IMc and the normal image IMn to calculate the difference thereof, and as a result, since the difference thereof exceeds the threshold, the defect article detection unit 26 determines that the center image IMc is abnormal. In the case illustrated in FIG. 14, since the center image IMc includes a defect D, the difference exceeds the threshold, and the center image IMc is determined as defective.

Next, in step S406, the defect article detection unit 26 outputs a determination result as to whether a center image created for an inspection image is normal or defective.

The defect article detection unit 26 performs step S401 to step S406 described above on each of the plurality of center images created for an inspection image.

Next, in step S407, the defect article detection unit 26 detects a defect article and outputs a detection result based on the determination result output in step S406. In detection of a defect article, if the number of center images determined to be defective for an inspection image is zero or less than or equal to a predetermined number, the defect article detection unit 26 determines that the inspection target article included in the inspection image is a normal article. On the other hand, if the number of center images determined as defective for the inspection image exceeds the predetermined number, the defect article detection unit 26 determines that the inspection target article included in the inspection image is a defect article.

Accordingly, the defect article detection unit 26 determines whether the inspection target article included in the inspection image is a normal article or a defect article to detect a defect article and outputs the detection result.

As described above, in the present example embodiment, since a learning model that restores a center image from a center-removed patch image is created by using a learning image including a normal article of an inspection target article, an image including a defect article is not required to be collected. Therefore, according to the present example embodiment, since a sufficient amount of learning data can be easily prepared, a learning model can be easily created.

Further, in the present example embodiment, a normal image is estimated and generated from a center-removed patch image in an inspection image to detect a defect article based on the estimated normal image. Thus, according to the present example embodiment, detection of a defect article having high robustness can be realized.

As described above, according to the present example embodiment, since an estimation image including at least a predetermined region of an inspection target article is generated as a normal image by using a part of an inspection image including an inspection target article, it is possible to distinguish a defect article, which is abnormal, at high accuracy while reducing influence of an individual difference of images.

Figure 15:
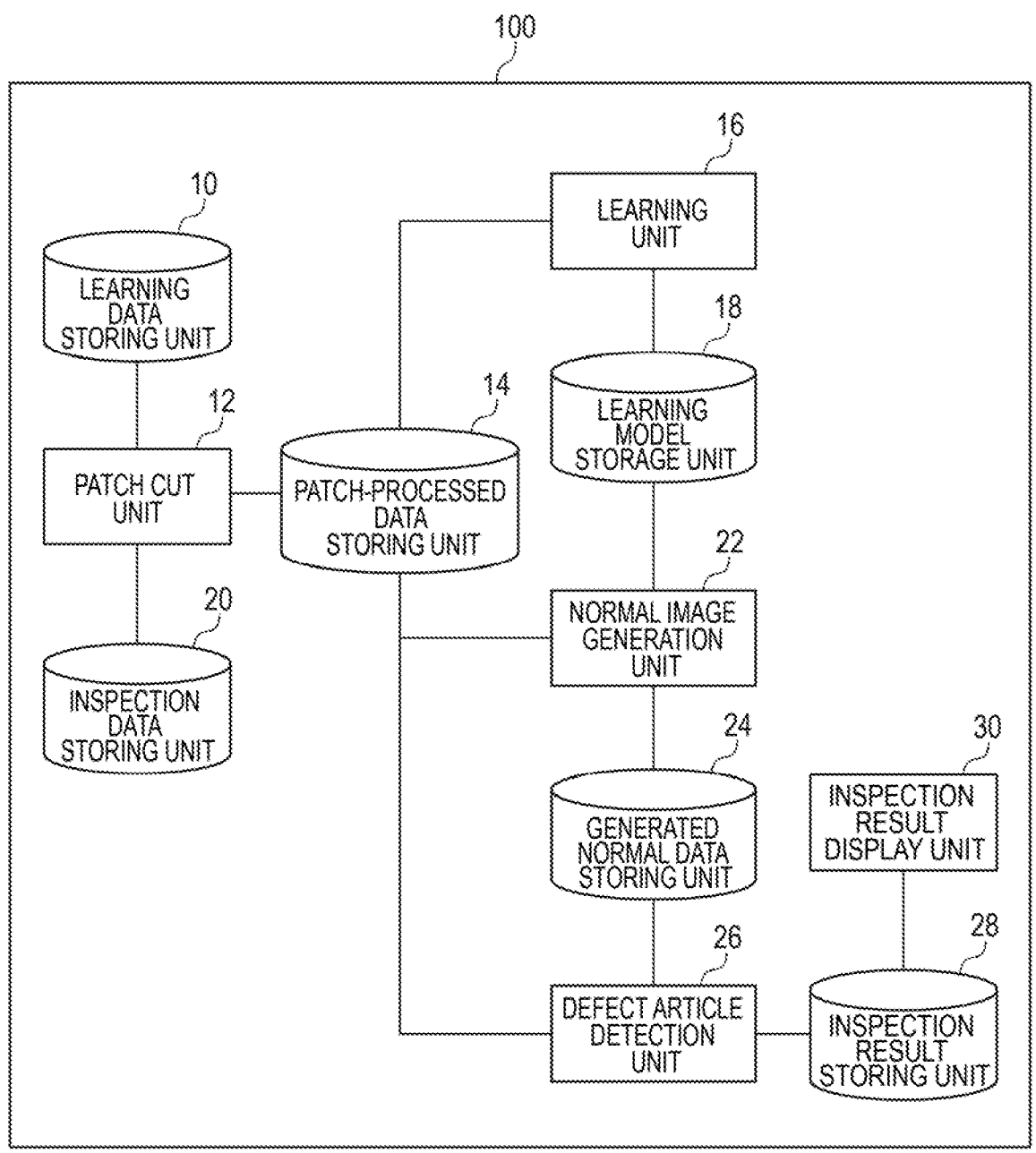
FIG. 15 is a block diagram illustrating a function configuration of an image processing apparatus according to a modified example of the first example embodiment of the present invention.

Note that, as illustrated in FIG. 15, the image processing apparatus 100 according to the present example embodiment can also be formed to have a detection result storing unit 28 and a detection result display unit 30. FIG. 15 is a block diagram illustrating a function configuration of an image processing apparatus according to a modified example of the present example embodiment In the case illustrated in FIG. 15, the defect article detection unit 26 stores a detection result of a defect article in the detection result storing unit 28. The defect article detection unit 26 can store, as a detection result, information representing whether an inspection target article is a normal article or a defect article, image data representing a defect position when an inspection target article is a defect article, or the like together with an identifier used for identifying an inspection image in the detection result storing unit 28, for example.

The detection result storing unit 28 stores a detection result of a defect article output by the defect article detection unit 26. For example, a database storing a detection result is stored in the detection result storing unit 28. A function of the detection result storing unit 28 is implemented by the HDD 1008 as with the learning data storing unit 10 or the like.

The detection result display unit 30 displays a detection result of a defect article stored in the detection result storing unit 28. When displaying a detection result, the detection result display unit 30 can display an image representing a defect position. The detection result display unit 30 is implemented by the output device 1010 as a display device.

Further, in the case illustrated in above FIG. 8, while the learning unit 16 trains and creates a learning model that restores a center image IMc of a center region forming a patch image IMp from a center-removed patch image IMr of a frame-shape region forming a patch image IMp, the example embodiment is not limited thereto. For example, the learning unit 16 can also train and create a learning model that restores the whole patch image IMp including the center image IMc from the center-removed patch image IMr to generate an estimation image in which the patch image IMp is estimated. In such a case, the normal image generation unit 22 can use such a learning model and generate, as a normal image, an estimation image used for estimating the whole of the patch image IMp in the case of a normal article. Further, the defect article detection unit 26 can compare the whole patch image IMp for an inspection image with an estimation image in which the whole patch image IMp is estimated and detect a defect article.

Another Example Embodiment

Figure 16:
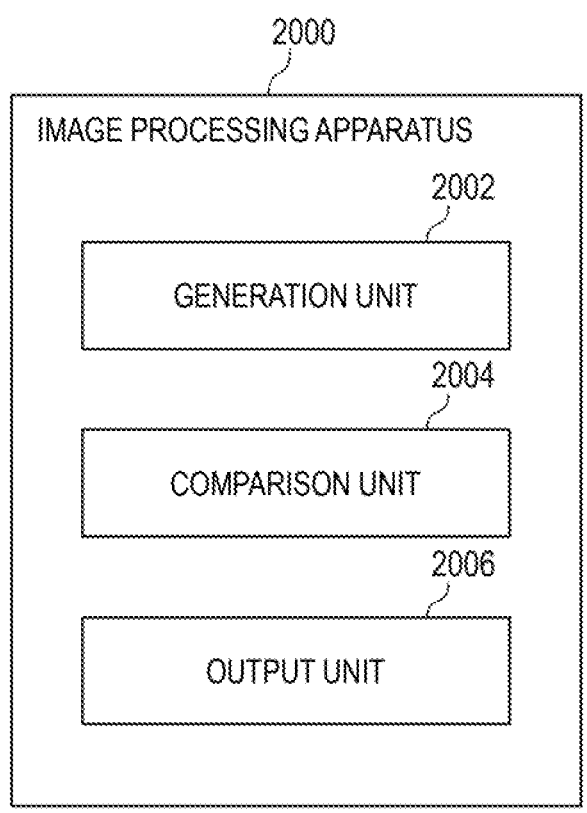
FIG. 16 is a block diagram illustrating a function configuration of an image processing apparatus according to another example embodiment of the present invention.

The image processing apparatus described in each of the above example embodiments can also be formed as illustrated in FIG. 16 according to another example embodiment. FIG. 16 is a block diagram illustrating a function configuration of an image processing apparatus according to another example embodiment.

As illustrated in FIG. 16, an image processing apparatus 2000 has a generation unit 2002 that generates an estimation image including at least a predetermined region of an inspection target by using a part of an inspection image including an inspection target. Further, the image processing apparatus 2000 has a comparison unit 2004 that compares an estimation image generated by a generation unit 2002 with an inspection image and an output unit 2006 that outputs a comparison result obtained by a comparison unit 2004.

According to the image processing apparatus 2000 according to another example embodiment, since an estimation image including at least a predetermined region of an inspection target is generated by using a part of an inspection image including an inspection target, it is possible to distinguish an anomaly at high accuracy while reducing influence of an individual difference of images.

Figure 17:
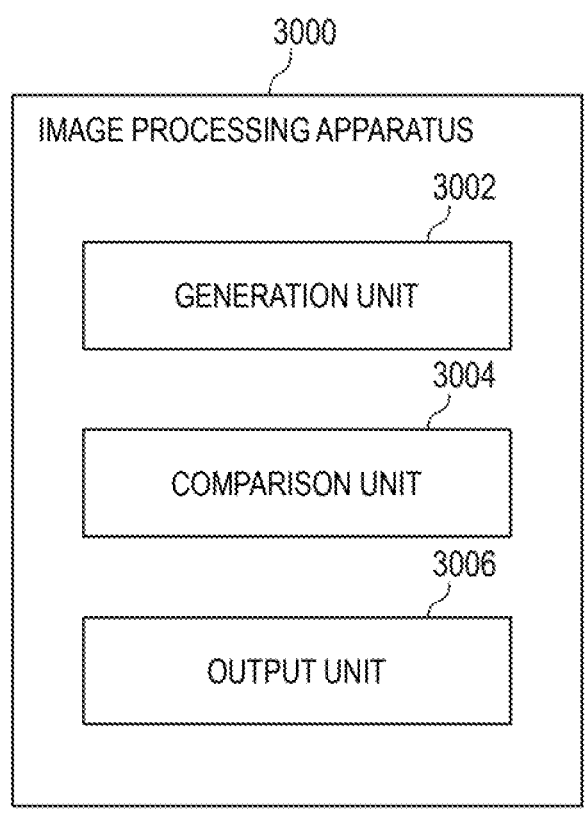
FIG. 17 is a block diagram illustrating a function configuration of an image processing apparatus according to yet another example embodiment of the present invention.

Further, according to yet another example embodiment, the image processing apparatus described in each of the above example embodiments can be formed as illustrated in FIG. 17. FIG. 17 is a block diagram illustrating a function configuration of an image processing apparatus according to yet another example embodiment.

As illustrated in FIG. 17, an image processing apparatus 3000 according to yet another example embodiment has a generation unit 3002 that generates a second image including at least a predetermined region of an object by using a part of a first image including an object. Further, the image processing apparatus 3000 has a comparison unit 3004 that compares the second image generated by the generation unit 3002 with the first image and an output unit 3006 that outputs a comparison result obtained by the comparison unit 3004.

According to the image processing apparatus 3000 according to yet another example embodiment, since a second image including at least a predetermined region of an object is generated by using a part of a first image including an object, it is possible to distinguish an anomaly at high accuracy while reducing influence of an individual difference of images.

Modified Example Embodiments

The present invention is not limited to the example embodiments described above, and various modifications are possible.

For example, while the case of inspection to detect a defect article from an inspection target article has been described as an example in the above example embodiments, the example embodiment is not limited thereto. The present invention can be widely applied to the case of determining whether an object is in a normal state or an abnormal state to detect an abnormal state of the object, that is, a state other than the normal state. The present invention can also be applied to a case of detecting breakage of an object such as a building as an anomaly, a case of detecting an abnormal object, or the like, for example.

Further, the scope of each of the example embodiments further includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the computer program described above is stored but also the computer program itself.

As the storage medium, for example, a floppy (registered trademark) disk, a hard disk, an optical disk, a magneto-optical disk, a compact disc-read only memory (CD-ROM), a magnetic tape, a nonvolatile memory card, or a ROM can be used. Further, the scope of each of the example embodiments includes an example that operates on operating system (OS) to perform a process in cooperation with another software or a function of an add-in board without being limited to an example that performs a process by an individual program stored in the storage medium.

Further, a service implemented by the function of each of the example embodiments described above may be provided to a user in a form of Software as a Service (SaaS).

The whole or part of the example embodiments disclosed above can be described as, but not limited to, the following supplementary notes.

(Supplementary Note 1)

An image processing apparatus comprising:

a generation unit that uses a part of an inspection image including an inspection target to generate an estimation image including at least a predetermined region of the inspection target;

a comparison unit that compares the estimation image generated by the generation unit with the inspection image; and an output unit that outputs a comparison result obtained by the comparison unit.

(Supplementary Note 2)

The image processing apparatus according to supplementary note 1, wherein the inspection image includes a first region and a second region, wherein the generation unit generates the estimation image of the second region by using an image of the first region in the inspection image, and wherein the comparison unit compares the image of the second region in the inspection image with the estimation image of the second region generated by the generation unit.

(Supplementary Note 3)

The image processing apparatus according to supplementary note 2, wherein the generation unit generates the estimation image by using a learning model trained so as to estimate the image of the second region from the image of the first region.

(Supplementary Note 4)

The image processing apparatus according to supplementary note 3, wherein the learning model is trained by using an image representing a normal state of the inspection target.

(Supplementary Note 5)

The image processing apparatus according to any one of supplementary notes 1 to 4, wherein the estimation image includes an image representing a normal state of the inspection target in the at least predetermined region.

(Supplementary Note 6)

The image processing apparatus according to any one of supplementary notes 1 to 5 further comprising a determination unit that determines whether or not the inspection image and the estimation image are the same based on the comparison result obtained by the comparison unit.

(Supplementary Note 7)

The image processing apparatus according to any one of supplementary notes 1 to 6, wherein the comparison unit calculates a difference between the inspection image and the estimation image.

(Supplementary Note 8)

An image processing method comprising:

a generation step of using a part of an inspection image including an inspection target to generate an estimation image including at least a predetermined region of the inspection target;

a comparison step of comparing the estimation image generated by the generation step with the inspection image; and an output step of outputting a comparison result obtained by the comparison step.

(Supplementary Note 9)

A storage medium storing a program that causes a computer to perform:

a generation step of using a part of an inspection image including an inspection target to generate an estimation image including at least a predetermined region of the inspection target;

a comparison step of comparing the estimation image generated by the generation step with the inspection image; and an output step of outputting a comparison result obtained by the comparison step.

(Supplementary Note 10)

An image processing apparatus comprising:

a generation unit that uses a part of a first image including an object to generate a second image including at least a predetermined region of the object;

a comparison unit that compares the second image generated by the generation unit with the first image; and an output unit that outputs a comparison result obtained by the comparison unit.

As described above, while the present invention has been described with reference to the example embodiments, the present invention is not limited to these example embodiments described above. Various modifications that can be appreciated by those skilled in the art can be made to the configuration and details of the present invention within the scope of the present invention.

This application is based upon and claims the benefit of priority from Japanese Patent Application No. 2017-210360, filed on Oct. 31, 2017, the disclosure of which is incorporated herein in its entirety by reference.

REFERENCE SIGNS LIST 10 learning data storing unit
12 patch cut unit
14 patch-processed data storing unit
16 learning unit
18 learning model storage unit
20 inspection data storing unit
22 normal image generation unit
24 generated normal data storing unit
26 defect article detection unit
28 inspection result storing unit
30 inspection result display unit
100 image processing apparatus

The invention claimed is:

1. An image processing apparatus comprising:
a generation unit that generates an estimation image by using a part of an inspection image including an inspection target, a first region, and a second region, wherein the estimation image includes at least a predetermined region of the inspection target and a corresponding second region;
a comparison unit that compares the estimation image with the inspection image; and
an output unit that outputs a comparison result obtained by the comparison unit,
wherein the generation unit generates the corresponding second region of the estimation image by using the first region of the inspection image, and
wherein the comparison unit compares the second region of the inspection image with the corresponding second region of the estimation image.

2. The image processing apparatus according to claim 1, wherein the generation unit generates the estimation image by using a learning model trained so as to estimate the second region from the first region.

3. The image processing apparatus according to claim 2, wherein the learning model is trained by using an image representing a normal state of the inspection target.

4. The image processing apparatus according to claim 1, wherein the predetermined region of the estimation image represents a normal state of the inspection target.

5. The image processing apparatus according to claim 4, wherein the determination unit determines whether the inspection target included in the inspection image is a normal article or a defect article.

6. The image processing apparatus according to claim 1, further comprising a determination unit that determines whether or not the inspection image and the estimation image are identical based on the comparison result obtained by the comparison unit.

7. The image processing apparatus according to claim 1, wherein the comparison unit calculates a difference between the inspection image and the estimation image.

8. The image processing apparatus according to claim 1, wherein the first region is a center-removed area of the inspection image, and the second region is a center part of the inspection image.

9. An image processing method comprising:
using a part of an inspection image including an inspection target, a first region, and a second region, to generate an estimation image including at least a predetermined region of the inspection target and a corresponding second region;
comparing the estimation image with the inspection image; and
outputting a comparison result obtained by the comparing,
wherein the estimation image of the second region is generated by using the first region of the inspection image, and
wherein the second region of the inspection image is compared with the corresponding second region of the estimation image.

10. A non-transitory storage medium storing a program that causes a computer to perform:
using a part of an inspection image including an inspection target, a first region, and a second region, to generate an estimation image including at least a predetermined region of the inspection target and a corresponding second region;
comparing the estimation image with the inspection image; and
outputting a comparison result obtained by the comparing,
wherein the estimation image of the second region is generated by using the first region of the inspection image, and
wherein the second region of the inspection image is compared with the corresponding second region of the estimation image.

* * * * *